United States Patent
Chabot et al.

(10) Patent No.: US 12,102,105 B2
(45) Date of Patent: Oct. 1, 2024

(54) HIGH Brix VACUUM EVAPORATION CONCENTRATION PROCESS AND SYSTEM AND CONCENTRATED PRODUCT

(71) Applicant: LES ÉQUIPEMENTS D'ÉRABLIÈRE CDL INC., Saint-Lazare-de-Bellechasse (CA)

(72) Inventors: Vallier Chabot, Armagh (CA); Martin Bergeron, St Come (CA)

(73) Assignee: LES ÉQUIPEMENTS D'ÉRABLIÈRE CDL INC., St-Lazare-de-Bellechasse (CA)

( * ) Notice: Subject to any disclaimer, the term of this patent is extended or adjusted under 35 U.S.C. 154(b) by 641 days.

(21) Appl. No.: 17/247,831

(22) Filed: Dec. 24, 2020

(65) Prior Publication Data
US 2021/0195930 A1 Jul. 1, 2021

Related U.S. Application Data

(60) Provisional application No. 62/953,379, filed on Dec. 24, 2019.

(51) Int. Cl.
*A23L 27/10* (2016.01)
*B01D 61/02* (2006.01)
(Continued)

(52) U.S. Cl.
CPC ............ *A23L 27/10* (2016.08); *B01D 61/025* (2013.01); *B01D 61/10* (2013.01); *B01D 61/145* (2013.01); *B01D 61/58* (2013.01); *C02F 9/00* (2013.01); *A23V 2002/00* (2013.01); *B01D 2311/103* (2013.01); *B01D 2311/2673* (2013.01); *B01D 2311/2692* (2013.01); *C02F 1/06* (2013.01);
(Continued)

(58) Field of Classification Search
CPC ........ B01D 61/58; B01D 61/04; B01D 61/10; B01D 61/145; B01D 61/025; B01D 2311/103; B01D 2311/08; B01D 2311/2673; B01D 2311/2692; C13B 20/165; A23L 29/30; A23L 27/10; C02F 9/00; C02F 2301/063; C02F 1/444; C02F 1/06; C02F 2103/32; C02F 1/441; C02F 2303/04; A23V 2002/00
USPC ........................................................ 426/658
See application file for complete search history.

(56) References Cited

U.S. PATENT DOCUMENTS

| | | | |
|---|---|---|---|
| 2005/0170047 A1* | 8/2005 | Watanabe | A23L 33/125 426/72 |
| 2007/0023347 A1* | 2/2007 | Chabot | B01D 61/08 210/321.6 |
| 2014/0261395 A1* | 9/2014 | Gaulin | C13B 20/165 127/55 |

* cited by examiner

*Primary Examiner* — Subbalakshmi Prakash
(74) *Attorney, Agent, or Firm* — LAVERY, DE BILLY, LLP; Gonzalo Lavin; James Duffy

(57) ABSTRACT

A process for concentrating a maple sap or sweet vegetal water solution is provided. The process comprises collecting the solution in a tank at temperature T1, wherein T1 is between 4° C. and 10° C.; concentrating the solution by means of a reverse osmosis concentrator to produce a high Brix solution of about 15 to about 40 Brix; heating the high Brix solution of about 15 to about 40 Brix to temperature T2, wherein T2 is between 40° C. and 85° C.; and evaporating the high Brix solution by means of a vacuum evaporator at temperature T3 to produce the concentrated product of about 60 to about 70 Brix, wherein T3 is between 55° C. and 80° C. A system for concentrating a maple sap or sweet vegetal water solution is provided, as well as a concentrated product produced by the process of the present invention.

3 Claims, 11 Drawing Sheets

(51) Int. Cl.
*B01D 61/10* (2006.01)
*B01D 61/14* (2006.01)
*B01D 61/58* (2006.01)
*C02F 9/00* (2023.01)
*C02F 103/32* (2006.01)
*C02F 1/06* (2023.01)
*C02F 1/44* (2023.01)

(52) U.S. Cl.
CPC .............. *C02F 1/441* (2013.01); *C02F 1/444* (2013.01); *C02F 2103/32* (2013.01); *C02F 2301/063* (2013.01); *C02F 2303/04* (2013.01)

HIGH Brix VACUUM EVAPORATION CONCENTRATION PROCESS AND SYSTEM AND CONCENTRATED PRODUCT

CROSS REFERENCE TO RELATED APPLICATIONS

This application claims benefit, under 35 U.S.C. § 119(e), of U.S. provisional application Ser. No. 62/953,379, filed on Dec. 24, 2019. All documents above are incorporated herein in their entirety by reference.

FIELD OF THE INVENTION

The present invention relates to an evaporation process for concentrating maple sap or more generally for concentrating a sweet vegetal aqueous solution. The present invention also relates to a concentrated product and applications therefor.

BACKGROUND OF THE INVENTION

Maple sap is traditionally obtained by placing buckets on each maple tree to collect sap, and each bucket has to be emptied into a large container which is then transported to a cabin by a horse or a tractor. More recent systems use tubing that collect the sap from each tree by means of pumps that send the sap to a centralized location or cabin. In the cabin, the sap is boiled using an evaporator in order to obtain maple syrup with a typical Brix value of 60 to 66. This known evaporation process has been used for many years.

However, there is a need for a more efficient process to concentrate sap or sweet vegetal water without denaturing or altering the nutritional properties of the product.

In addition, the demand for maple products is growing. The interest of several companies in the food sector for goods (such as energy drinks, alcohol, fertilizers, distilleries, animal nutrition, etc.) to have a natural sweetening agent such as maple sap (or sweetened vegetable water) which is not traditional syrup, which is high in nutrients, and which can be preserved at room temperature is increasing. Since 2013, the demand for maple sap in terms of volume has increased to 7 million liters in 2019. This natural liquid extracted from sugar maple trees is composed mainly of water and sucrose (2 to 3%). Its other constituents are organic compounds such as reducing sugars (glucose and fructose) and nitrogen compounds (peptides and amino acids). This chemical composition makes it a favorable environment for the growth of microorganisms. The sap is practically sterile when extracted from the tree, but is subsequently contaminated at the tap and in the collection system. The rate of contamination is strongly influenced by the temperature outside and the storage time of the sap in the collection tanks. This contamination significantly affects the quality of maple sap and its derived products.

There is therefore a need in the industry to provide an improved maple sap concentration process.

SUMMARY OF THE INVENTION

The concentration of maple sap by reverse osmosis (RO) has been tested by the Applicant. However, Applicant has discovered that this operation simultaneously concentrates the microorganisms initially present in the sap. As a result, the microbial load of the final concentrate generally becomes higher than the raw maple sap. This enrichment in microorganisms weakens the storage potential of the concentrate for long periods of time. For these reasons, Applicant has discovered that it is necessary to treat it quickly and on site by an appropriate technique which guarantees the stabilization of its quality. In this sense, the potential of both microfiltration and ultrafiltration for the conservation of sap and maple sap concentrate have been investigated. However, the removal of microorganisms by these processes extended the shelf life of these products for only a short time. In addition, maple products are legally protected as natural products, so it is not permitted to add preservative chemicals to extend their shelf life. Currently, the shelf life of maple sap and concentrate is very limited, and refrigerated storage is expensive and impractical for large volumes of commerce.

It In accordance with the present invention, there is provided:

1. A process for concentrating a maple sap or sweet vegetal water solution, comprising:
   a) collecting the maple sap or sweet vegetal water solution in a tank (A) at temperature T1, wherein T1 is between 4° C. and 10° C.;
   b) optionally filtering the maple sap or sweet vegetal water solution by means of an ultrafiltration unit (B) to produce a filtered solution;
   c) concentrating the maple sap or sweet vegetal water solution or the filtered solution by means of a reverse osmosis concentrator (C) to produce a high Brix solution of about 15 to about 40 Brix;
   d) heating the high Brix solution of about 15 to about 40 Brix to temperature T2, wherein T2 is between 40° C. and 85° C.;
   e) evaporating the high Brix solution by means of a vacuum evaporator (D) at temperature T3 to produce the concentrated product of about 60 to about 70 Brix, wherein T3 is between 55° C. and 80° C.; and
   f) optionally heating the concentrated product of about 60 to about 70 Brix to temperature T4, wherein T4 is about 85° C.; or
   g) if the concentrated product is less than 66 Brix, optionally heating the concentrated product in a thermal evaporator (E) to temperature T5 until the concentrated product is at least 66 Brix, wherein T5 is between 95° C. and 105° C.

2. The process of item 1, wherein the concentrated product is intact without altering the taste, the nature and the quality of the maple sap or sweet vegetal water solution collected initially.

3. The process of item 1 or 2, wherein step c) and step d) are performed at the same site (in situ).

4. The process of any one of items 1-3, wherein step b) is performed.

5. The process of any one of items 1-4, wherein step f) is performed, such that the concentrated product is a pasteurized concentrated nectar product.

6. The process of any one of items 1-4, wherein step g) is performed, such that the concentrated product is a pasteurized concentrated nectar syrup product.

7. The process of any one of items 1-6, wherein an osmosis operation of the reverse osmosis concentrator (C) uses an internal submersible motor to condition the high Brix solution at a suitable temperature for a next step in the process.

8. The process of any one of items 1-7, further comprising the step of hot packaging the concentrated product.

9. A system for concentrating a maple sap or sweet vegetal water solution, comprising:
a) a tank (A) for collecting the maple sap or sweet vegetal water solution at temperature T1, wherein T1 is between 4° C. and 10° C.;
b) an optional ultrafiltration unit (B) for filtering the maple sap or sweet vegetal water solution to produce a filtered solution;
c) a reverse osmosis concentrator (C) for concentrating the maple sap or sweet vegetal water solution or the filtered solution to produce a high Brix solution of about 15 to about 40 Brix;
d) a first heating means for heating the high Brix solution of about 15 to about 40 Brix to temperature T2, wherein T2 is between 40° C. and 85° C.;
e) a vacuum evaporator (D) for evaporating the high Brix solution at temperature T3 to produce the concentrated product of about 60 to about 70 Brix, wherein T3 is between 55° C. and 80° C.; and
f) an optional second heating means for heating the concentrated product of about 60 to about 70 Brix to temperature T4, wherein T4 is about 85° C.; or
g) an optional a thermal evaporator (E) for heating the concentrated product, if the concentrated product is less than 66 Brix, to temperature T5 until the concentrated product is at least 66 Brix, wherein T5 is between 95° C. and 105° C.
10. The system of item 9, wherein the reverse osmosis concentrator and the first heating means are located at the same site (in situ).
11. The system of item 9 or 10, wherein the ultrafiltration unit (B) is present.
12. The system of any one of items 9-11, wherein one of the second heating means or the thermal evaporator (E) is present.
13. The system of any one of items 9-12, wherein the reverse osmosis concentrator (C) comprises an internal submersible motor.
14. The system of any one of items 9-13, further comprising hot packaging means for hot packaging the concentrated product.
15. A concentrated product, wherein the concentrated product has a degrees Brix of about 60 to about 70 Brix, and wherein the concentrated product is made from a maple sap or sweet vegetal water solution.
16. The concentrated product of item 15, wherein the concentrated product is a concentrated nectar product.
17. The concentrated product of item 15 or 16, wherein the concentrated product has been produced using the process of any one of items 1-8 or the system of any one of items 9-14.
18. The concentrated product of any one of items 15-17, wherein the concentrated product has at least one of the following:
  a phosphorus concentration of at least about 15 mg/kg;
  a potassium concentration at least about 2500 mg/kg;
  a calcium concentration of at least about 1200 mg/kg;
  a manganese concentration of at least about 100 mg/kg or at least about 170 mg/kg;
  an oxalic acid concentration of at least about 10 mg/kg;
  a quinic acid concentration of at least about 100 mg/kg or at least about 500 mg/kg;
  a malic acid concentration of at least about 8000 mg/kg;
  a lactic acid concentration of at least about 150 mg/kg;
  an acetic acid concentration of at least about 700 mg/kg, at least about 1000 mg/kg, or at least about 1500 mg/kg;
  a fumaric acid concentration of at least about 130 mg/kg;
  a succinic acid concentration of at least about 260 mg/kg;
  a total organic acid concentration of at least about 8000 mg/kg, preferably at least about 10000 mg/kg, more preferably at least about 12000 mg/kg;
  an ORAC value of at least about 650 μmol TE/100 g;
  an aerobic bacteria plate count of at most about 5 UFC/mL or at most about 2 UFC/mL;
  an anaerobic bacteria plate count of at most about 5 UFC/mL or at most about 2 UFC/mL; or
  a fungi plate count of at most about 5 UFC/mL, at most about 4 UFC/mL, or at most about 2 UFC/mL.
19. The concentrated product of any one of items 15-18, essentially free of Maillard reactions or wherein a very low amount of MAILLARD reactions have occurred.
20. The concentrated product of any one of items 15-19, wherein a concentration of at least one of potassium, calcium, magnesium, manganese, polyphenols, malic acid, citric acid, succinic acid, quinic acid, or acetic acid is higher than, at least about the same as, at most about 5% lower than, at most about 10% lower than, or at most about 20% lower than a concentration of potassium, calcium, magnesium, manganese, polyphenols, malic acid, citric acid, succinic acid, quinic acid, or acetic acid in an initial maple sap or sweet vegetal water solution.
21. A sweetening agent comprising the concentrated product as defined in any one of items 15-20.
22. A process for concentrating a maple sap or sweet vegetal water solution, comprising:
a) collecting the solution in a tank (A) at temperature T1, wherein T1 is between 4° C. and 10° C.;
b) optionally filtering the solution by means of an ultrafiltration unit (B) to produce a filtered solution;
c) concentrating the solution or the filtered solution by means of a reverse osmosis concentrator (C) to produce a high Brix solution of about 15 to about 40 Brix; and
d) optionally heating the high Brix solution of about 15 to about 40 Brix to temperature T2, wherein T2 is between 40° C. and 85° C.

DETAILED DESCRIPTION OF THE ILLUSTRATIVE EMBODIMENTS

Figure 1:
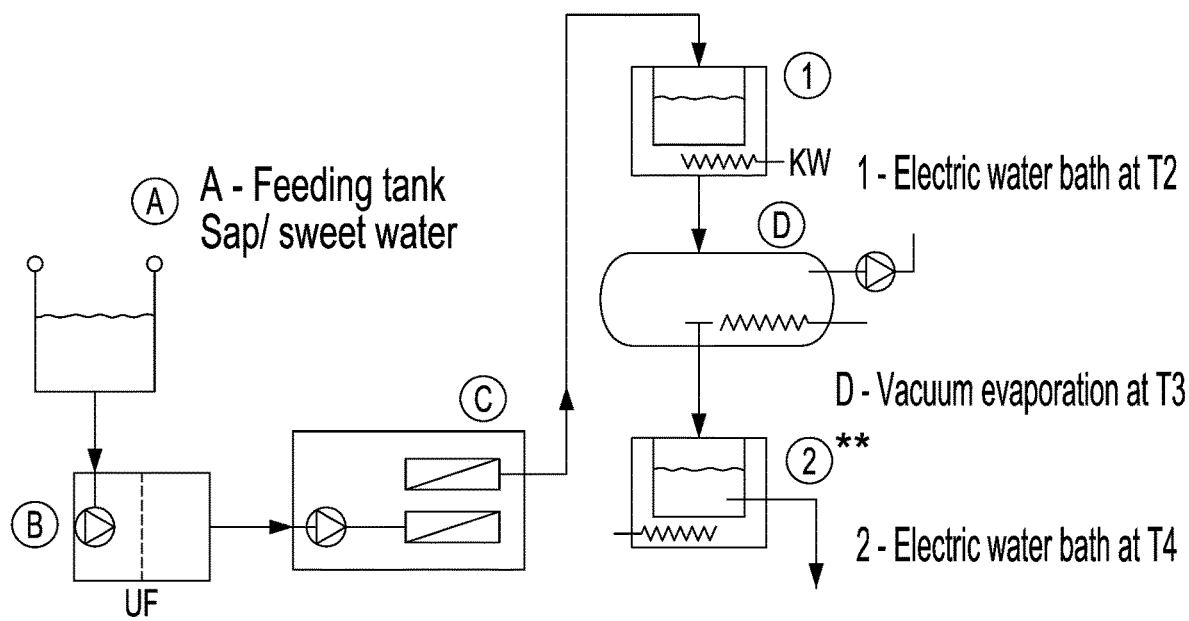
FIG. 1 is a schematic diagram of a vacuum concentration process, according to an embodiment of the present invention.

It is therefore an object of the present invention to use a series of components arranged in a process to evaporate by vacuum and to concentrate sap or sweet vegetal water without denaturing or altering the nutritional properties of the product.

In order to address the above and other drawbacks, there is provided a process for concentrating maple sap or a sweet vegetal water solution as defined in the claims.

In embodiments, the vacuum concentration process uses simple and basic components. The vacuum concentration process is relatively simple to implement and may be fully automated. In particular, the vacuum concentration process maintains the sap of the maple tree, or the sweet vegetal water, close to the original product without any significant alteration to the very nature of the product (e.g. nutritional value). This process may also allow for a quick return on investment with very low energy consumption.

The present inventors have developed a new method for preserving maple sap in near-original condition. The process can involve storing maple sap in the form of a concentrate or a concentrated product called maple "NECTAR" (term used when it is higher than 60 brix). The Nectar has a final brix of 60 to 70 brix. Concentration is done by a combination of physical and thermal processes, defined in more detail below.

With the present invention, there is provided a process, as well as a system, for concentrating a maple sap or sweet vegetal water solution to between about 60 brix and about 70 brix without denaturing or altering the nutritional properties of a resulting concentrated product. There is also provided the concentrated product itself. It should be noted that concentrated nectar product is differentiated from concentrated nectar syrup product as concentrated nectar product is concentrated without or with very little occurrence of Maillard reactions (no cooking of sugars). Accordingly, concentrated nectar product does not have the characteristic syrup taste (caramelization taste due to cooking), meaning it can be used as a natural sweetening agent.

High Brix Vacuum Evaporation Concentration Process

In a first aspect of the present invention, a process for concentrating a maple sap or sweet vegetal water solution into a concentrated product is provided, comprising:
  a) collecting the maple sap or sweet vegetal water solution in a tank (A) at temperature T1, wherein T1 is between 4° C. and 10° C.;
  b) optionally filtering the maple sap or sweet vegetal water solution by means of an ultrafiltration unit (B) to produce a filtered solution;
  c) concentrating the maple sap or sweet vegetal water solution or the filtered solution by means of a reverse osmosis concentrator (C) to produce a high Brix solution of about 15 to about 40 Brix;
  d) heating the high Brix solution of about 15 to about 40 Brix to temperature T2, wherein T2 is between 40° C. and 85° C.;
  e) evaporating the high Brix solution by means of a vacuum evaporator (D) at temperature T3 to produce the concentrated product of about 60 to about 70 Brix, wherein T3 is between 55° C. and 80° C.; and
  f) optionally heating the concentrated product of about 60 to about 70 Brix to temperature T4, wherein T4 is about 85° C.; or
  g) if the concentrated product is less than 66 Brix, optionally heating the concentrated product in a thermal evaporator (E) to temperature T5 until the concentrated product is at least 66 Brix, wherein T5 is between 95° C. and 105° C.

The skilled person would understand that heating steps d) and f) can be performed using any known technique in the art. In preferred embodiments, heating steps d) and f) are performed using a water bath or a plate heat exchanger.

Regarding step a), the maple sap or sweet vegetal water solution are collected at temperature T1, as higher temperatures may cause the maple sap or sweet vegetal water solution to degrade.

Regarding step b), while this step is optional, it is preferably that this step is performed, as it helps stabilize the solution, leading to a more stable concentrated product.

Regarding step c), the high Brix solution typically is at a temperature of around 30° C. after it is concentrated using the reverse osmosis concentrator. In addition, it should be mentioned that the high Brix solution of about 15 to about 40 Brix can itself be collected as a "final product" that can then be pasteurized. In such an embodiment, steps d)-g) would not be performed. Furthermore in such an embodiment, high Brix solution of about 15 to about 40 Brix can be heated in a thermal evaporator (E) to temperature T5 until the concentrated product is at least 66 Brix (preferably 66 Brix), wherein T5 is between 95° C. and 105° C., thereby resulting in a concentrated syrup product.

Regarding step d), the high Brix solution is heated to temperature T2, as higher temperatures would risk increasing Maillard reactions (cooking of sugars). In preferred embodiments, step d) is performed at the same site (in situ) as step c). This is because, if the high Brix solution of step c) needs to be transported, this can result in the degradation of the high Brix solution. In fact, with conventional processes for producing conventional maple syrup, steps such as heating steps are performed at different sites than other steps, thereby increasing the level of degradation in the resulting product. In preferred embodiments of the present invention, by performing step d) and step c) at the same site (in situ), this helps to keep the concentrated product closest, nutritionally, to the initial maple sap or sweet vegetal water solution.

Similarly, evaporation step e) is performed at temperature T3 to avoid exposing the high Brix solution to high temperatures that would risk increasing Maillard reactions. The skilled person would understand that the temperature of T3 can be adjusted depending on the level of vacuum under which the step is performed. In embodiments, the vacuum is between 15 to 25 "Hg, preferably 15 to 22 "Hg. It follows from the above that when step e) is performed, the resulting concentrated product is a concentrated nectar product and not a concentrated nectar syrup product.

Regarding step f) the concentrated product can be heated to temperature T4 so as to pasteurize the concentrated product without exposing the concentrated product to high temperatures that would risk increasing Maillard reactions. Accordingly, step f) should be performed for a sufficient amount of time in order to pasteurize the concentrated product (typically at least 10 minutes). Accordingly, when step f) is performed, the resulting concentrated product is a pasteurized concentrated nectar product and not a concentrated nectar syrup product.

Regarding step g) the concentrated product can be heated in a thermal evaporator (E) to temperature T5 so as to pasteurize the concentrated product (if performed for at least 10 minutes), increase the Brix of the concentrated product to between 66 Brix and 70 Brix (preferably to 66 Brix), and to expose the concentrated product to high temperatures, thereby increasing Maillard reactions and caramelizing the concentrated product. Accordingly, when step g) is performed, the resulting concentrated product is a (pasteurized, if performed for a sufficient amount of time) concentrated nectar syrup product and not a concentrated nectar product. In preferred embodiments, temperature T5 is between 100° C. and 105° C.

It should also be noted that the concentrated product may start to crystallize once it reaches above 70 Brix. This is why the concentrated product has a degrees Brix of between 60 and 70.

It should also be noted that conventional syrup products are filtered after they are produced. In preferred embodiments of the present invention, the concentrated product is not filtered after it is produced, thereby helping preserve the nutritional value of the concentrated product.

Referring first to FIG. 1, a feeding tank (A) is used to hold the desired volume of sap. The sap then passes through an ultrafiltration unit (B), which facilitates the passage to the high-speed reverse osmosis concentrator (C), which concentrates the product up to 15 to 40 Brix or 30 to 40 Brix of sugar level. Subsequently, the water is transferred into a water bath (1) to increase its temperature to be more efficient in the vacuum evaporation process (D). Then, a batch transfer (or series) of the volume of water is provided to the evaporator (D). This is done at a temperature T3 to reach a maximum concentration level of about 60 to about 70 Brix before being transferred back to the second water bath (2). The second water bath (2) can condition the sugar water to a temperature of 185° F. which will allow for hot packaging of the concentrated product with a high nutritional value and to maximize the preservation of the product at room temperature (shelf life).

In the event that one wants to obtain a concentrated nectar syrup product instead of a concentrated nectar product, one can replace the second water tank (2) with a heat treatment, such as with a thermal evaporator (E) to allow the concentrate to be converted into concentrated nectar syrup product by caramelizing it at a temperature above 100° C. It should be noted that this step can be performed instead of heating the evaporated solution in a second water bath (2) at temperature T4.

Figure 2:
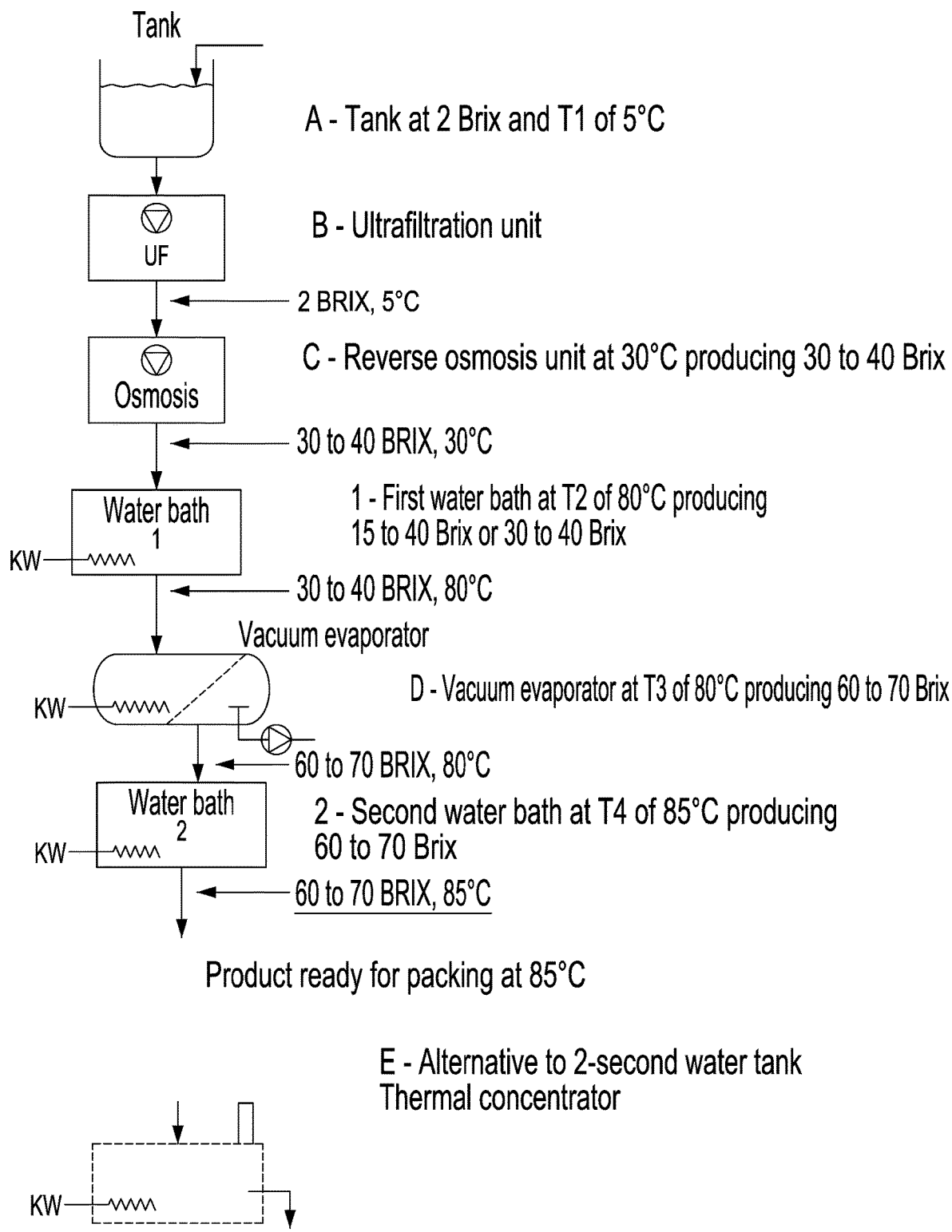
FIG. 2 is a schematic diagram of a vacuum concentration process, according to another embodiment of the present invention.

Referring to FIG. 2, another example of the process according to the present invention is illustrated. First, a feeding tank (A) is used to hold the desired volume of sap, such as for example sweet water of 2 Brix at a temperature of about 5°. Then the sweet water passes through an ultrafiltration unit (B), which facilitates the passage to the high-speed reverse osmosis concentrator (C), which concentrates the product up to 15 to 40 Brix or 30 to 40 Brix of sugar level. Subsequently, the water is transferred into a water bath (1) to increase its temperature to be more efficient in the vacuum evaporation process (D). Then a batch transfer (or series) of the volume of water is provided to the evaporator (D). This is done at a temperature T3, for example 80° C., to reach a maximum concentration level of about 60 to 70 Brix before being transferred back to the second water bath (2). The second water bath (2) will condition the sugar water to a temperature of 85° C. or 185° F. which will allow for hot packaging of the concentrated product with a high nutritional value and to maximize the preservation of the product at room temperature (shelf life).

As may be appreciated, the use of the vacuum process coupled with ultrafiltration, osmosis concentrator and water bath to concentrate beyond 60 Brix the sap or vegetal sweet water, can result in a product without significant alteration, without being denatured and overheated to ensure and preserve the best possible nutritional value of the concentrated product and achieve a high Brix (60 to 70 Brix) while optimizing the preservation without having to cook or boil the product above 100° C.

Figure 3:
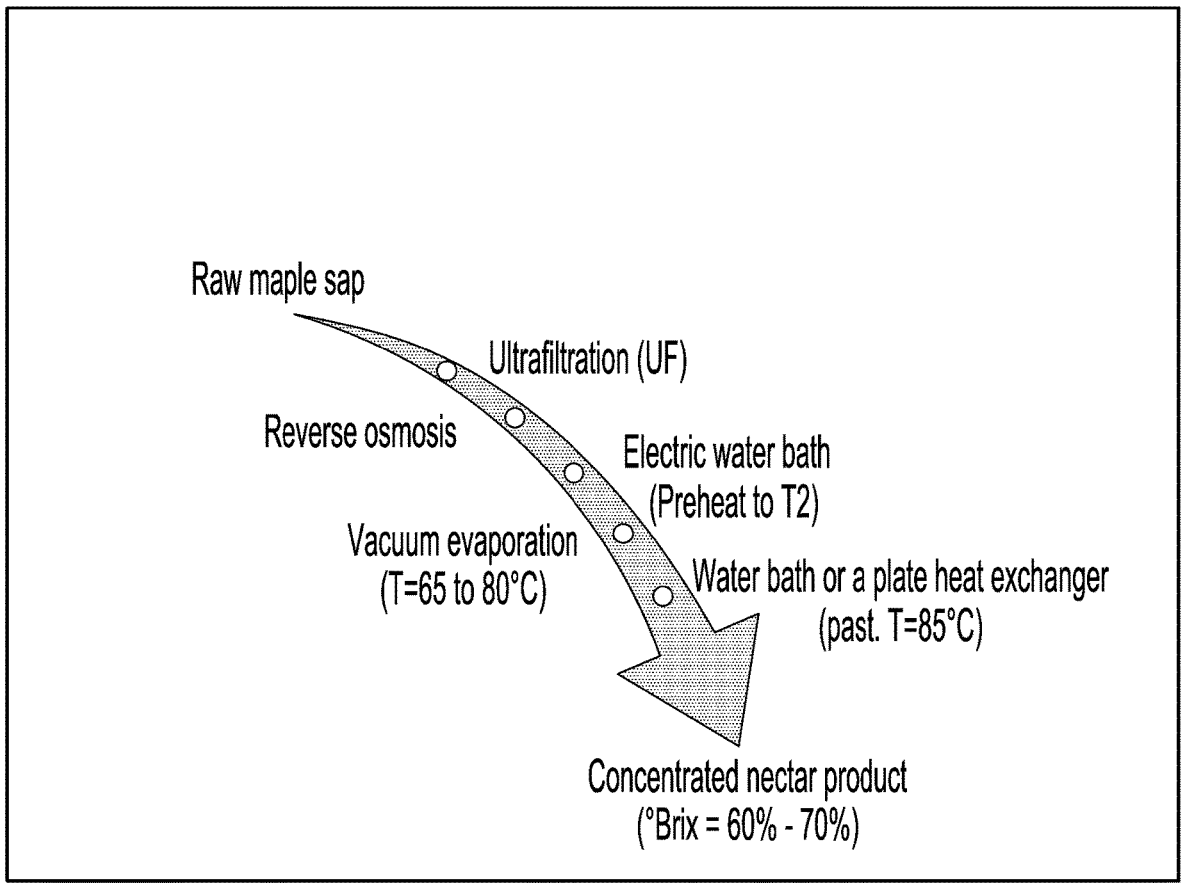
FIG. 3 is a schematic diagram of a vacuum concentration process, according to another embodiment of the present invention.
Figure 4:
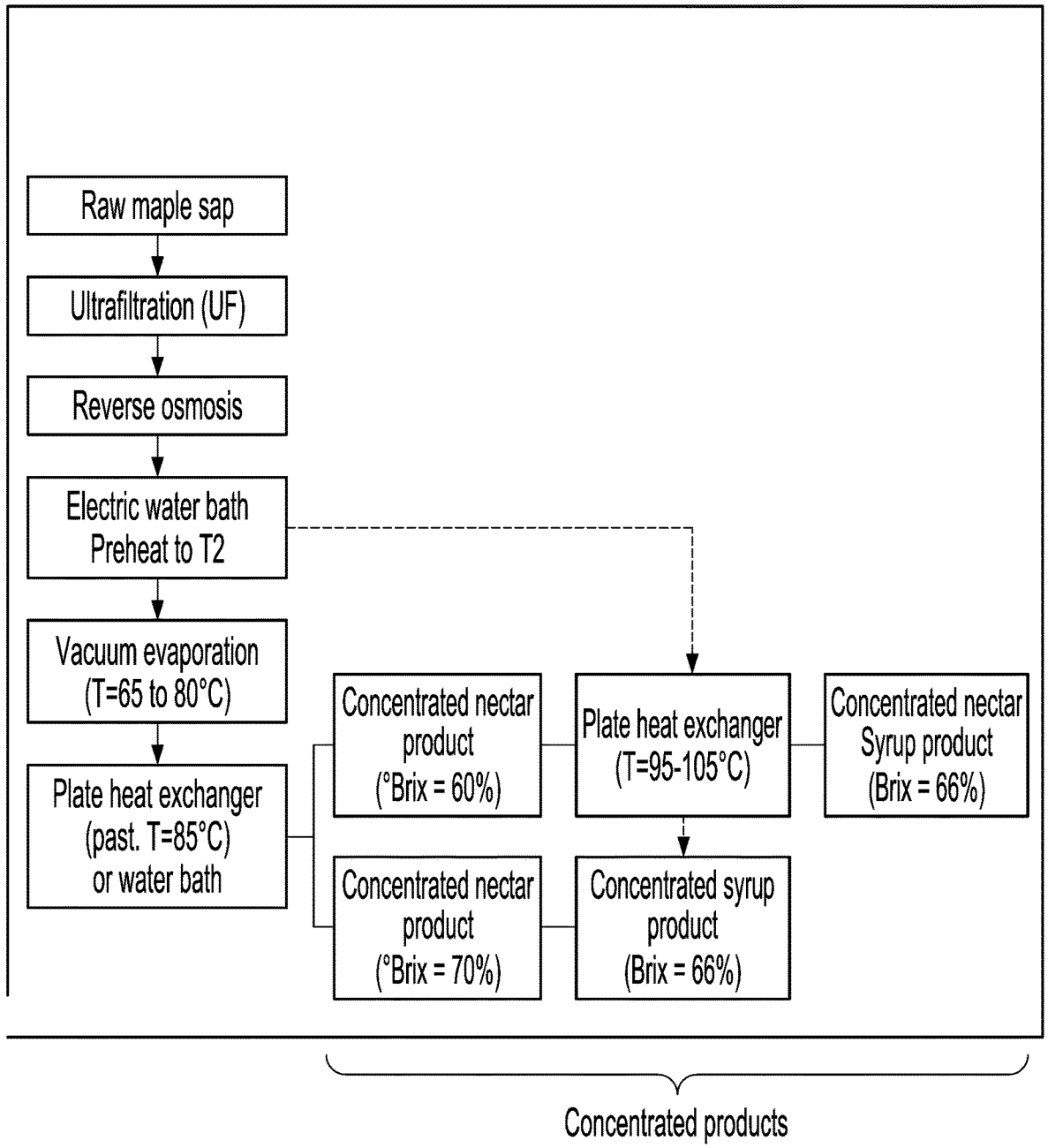
FIG. 4 is a schematic diagram of a vacuum concentration process, according to another embodiment of the present invention.

Referring to FIGS. 3 and 4, further examples of the process according to the present invention are illustrated, similar to those depicted in FIGS. 1 and 2. The process shown in FIG. 4 demonstrates how the concentrated product can be inter alia a concentrated nectar product or a concentrated nectar syrup product depending on the process used. Furthermore as mentioned previously, in an alternative embodiment, high Brix solution of about 15 to about 40 Brix from step c) or d) can be heated in a thermal evaporator (E) to temperature T5 until the concentrated product is at least 66 Brix, wherein T5 is between 95° C. and 105° C., thereby resulting in a (pasteurized, depending on how long heating was performed) concentrated syrup product (as shown in FIG. 4).

In embodiments, the object of the invention comprises a process (see FIG. 3) to achieve evaporation by vacuum and to concentrate sap or vegetable water from 2 brix to at least 60 brix (see FIG. 4) without denaturing or altering the nutritional properties of the product itself, allowing for the production of a unique concentrated product, preferably a concentrated nectar product, with no equivalent on the market.

In embodiments, the concentrated product, preferably the concentrated nectar product, is obtained by using a vacuum process combined with ultrafiltration, an osmosis concentrator, and a light heat treatment (up to 80 C) to concentrate the sap or vegetable sugar water to a brix of at least 60 brix without deteriorating, without denaturing, and without overheating the sap or vegetable sugar water in order to preserve the nutritional value of the concentrated product and achieve a conservation brix between 60 and 70 brix. This can also optimize preservation without having to cook or boil the product above 100 C. The process can also allow the product to be obtained with very inexpensive energy consumption.

Figure 5:
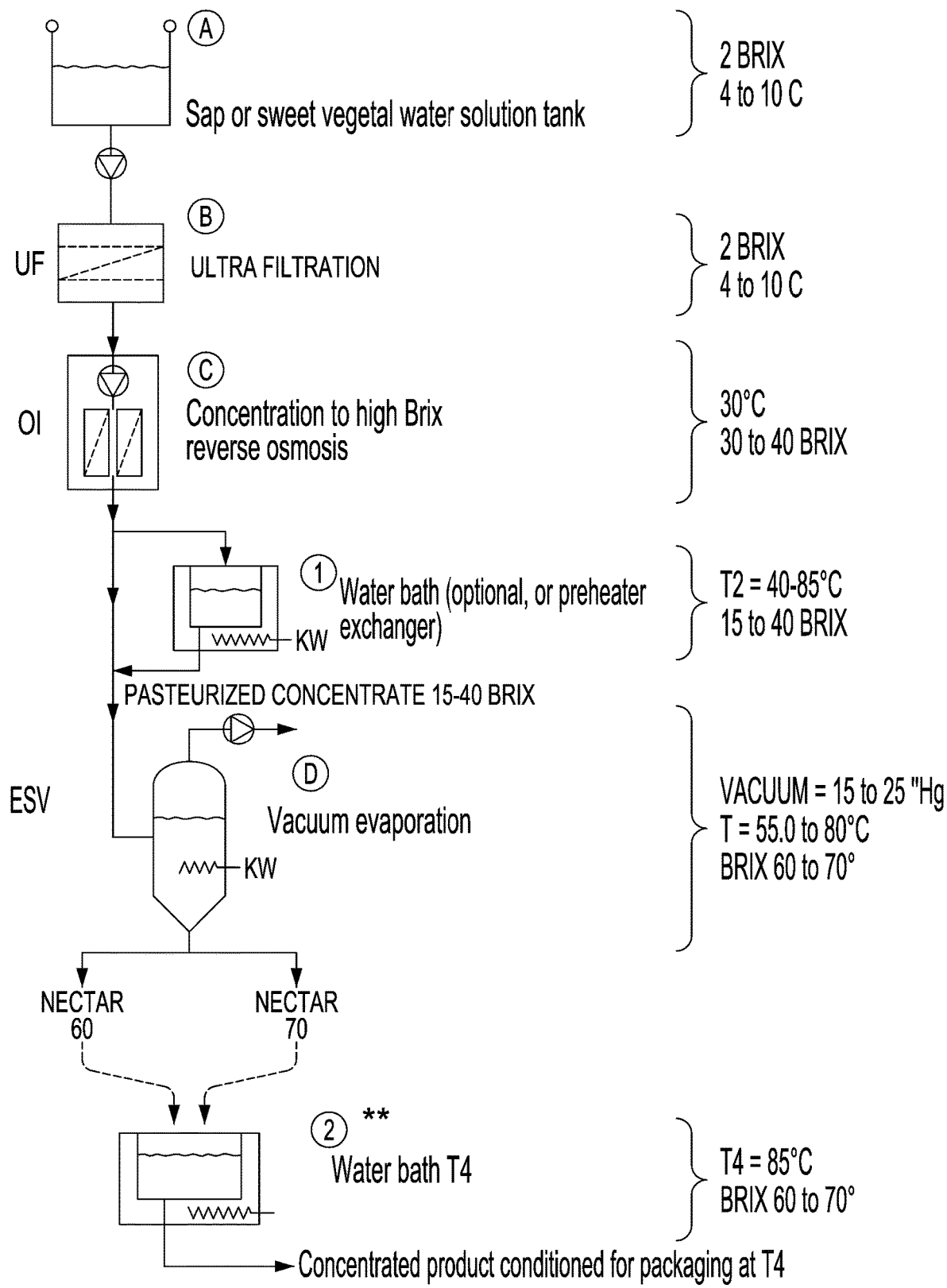
FIG. 5 is a schematic diagram of a vacuum concentration process, according to another embodiment of the present invention.
Figure 6:
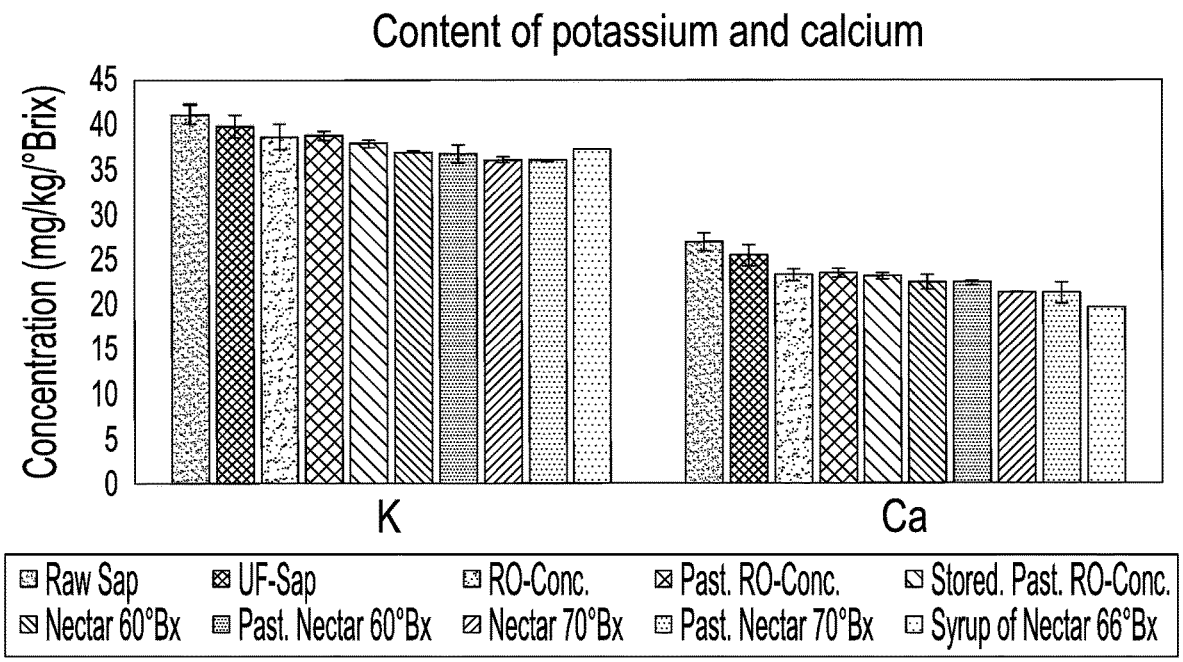
FIG. 6 is a graph showing the concentration of potassium and calcium of various solutions obtained at various stages of the process of the present invention, including the concentrated product according to embodiments of the present invention at various degrees Brix.
Figure 7:
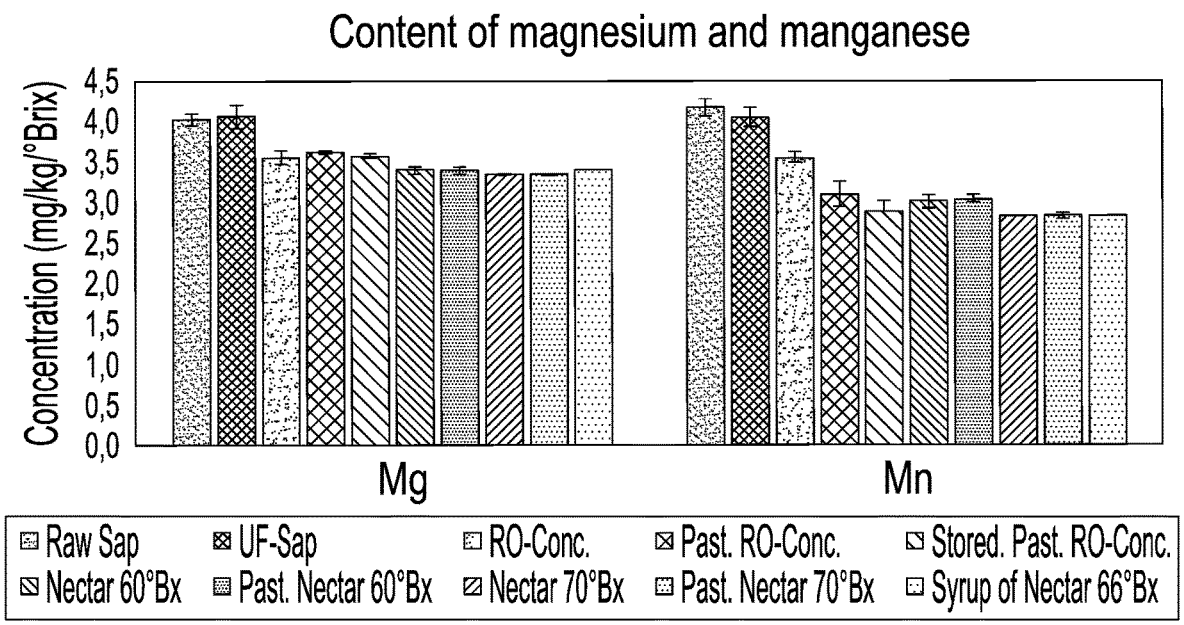
FIG. 7 is a graph showing the concentration of magnesium and manganese of various solutions obtained at various stages of the process of the present invention, including the concentrated product according to embodiments of the present invention at various degrees Brix.
Figure 8:
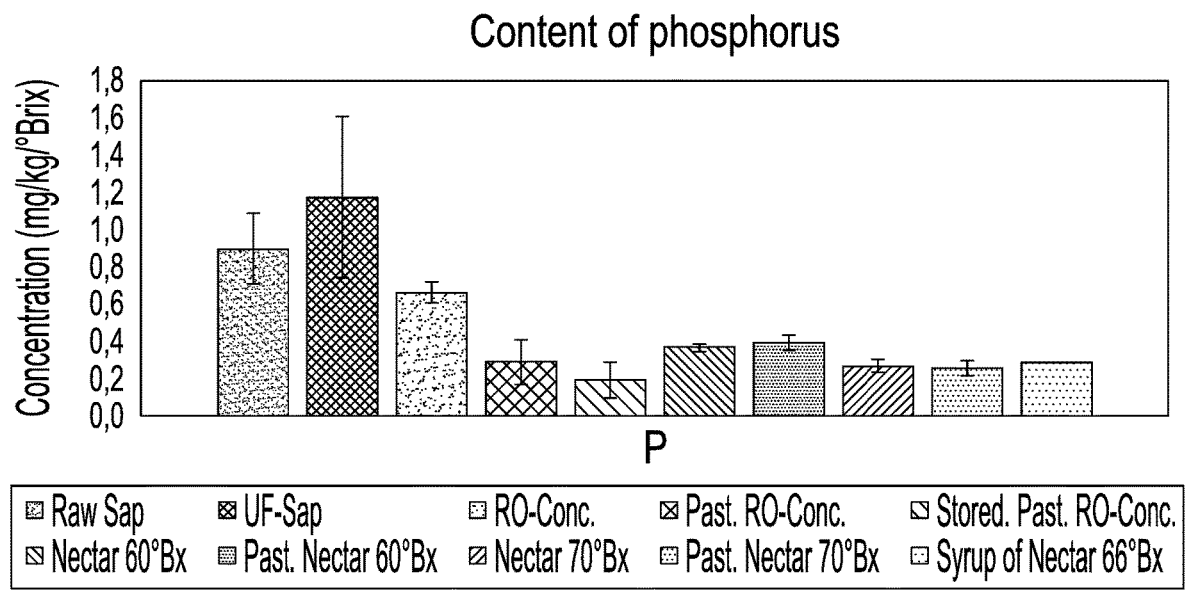
FIG. 8 is a graph showing the concentration of phosphorus of various solutions obtained at various stages of the process of the present invention, including the concentrated product according to embodiments of the present invention at various degrees Brix.
Figure 9:
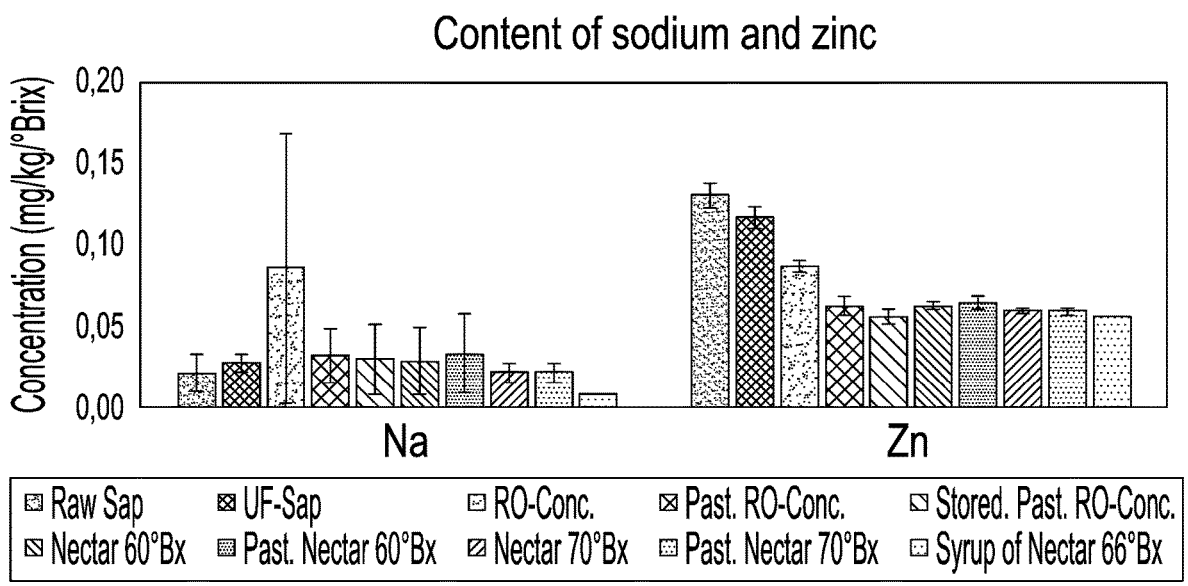
FIG. 9 is a graph showing the concentration of sodium and zinc of various solutions obtained at various stages of the process of the present invention, including the concentrated product according to embodiments of the present invention at various degrees Brix.
Figure 10:
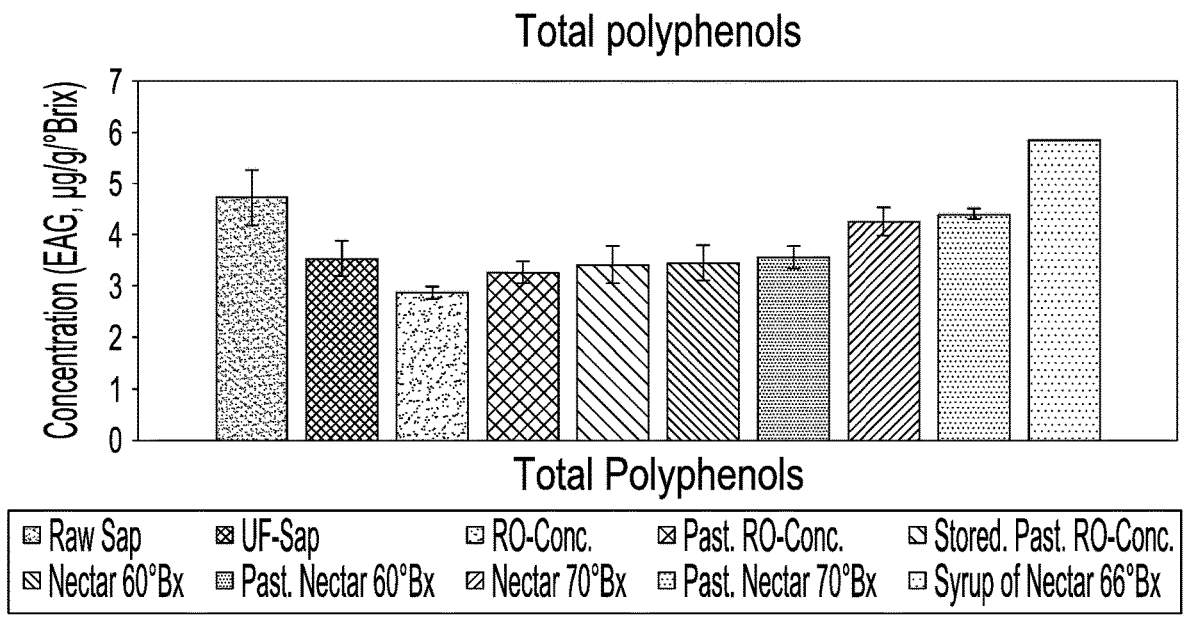
FIG. 10 is a graph showing the concentration of polyphenols of various solutions obtained at various stages of the process of the present invention, including the concentrated product according to embodiments of the present invention at various degrees Brix.
Figure 11:
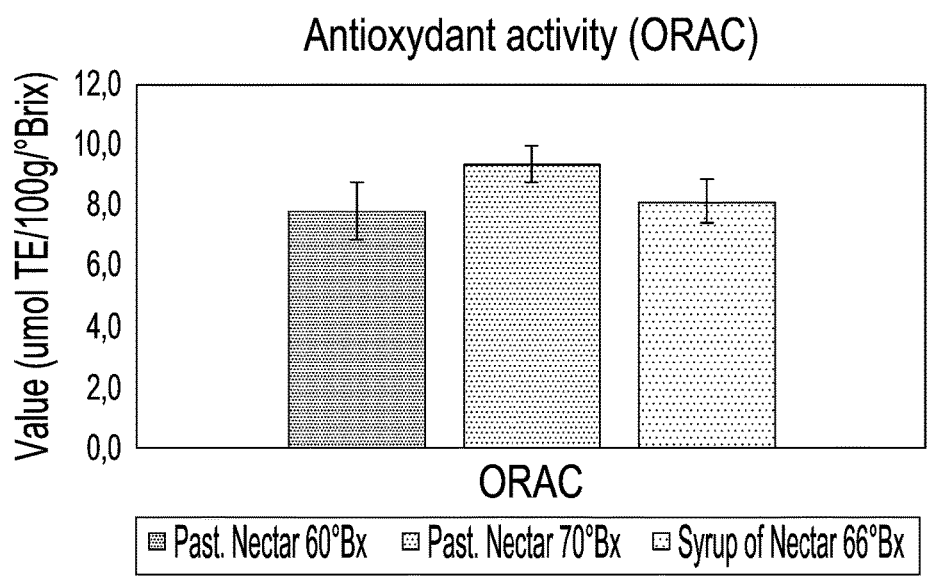
FIG. 11 is a graph showing the Oxygen Radical Absorbance Capacity (ORAC) of the concentrated product according to embodiments of the present invention at various degrees Brix.
Figure 12:
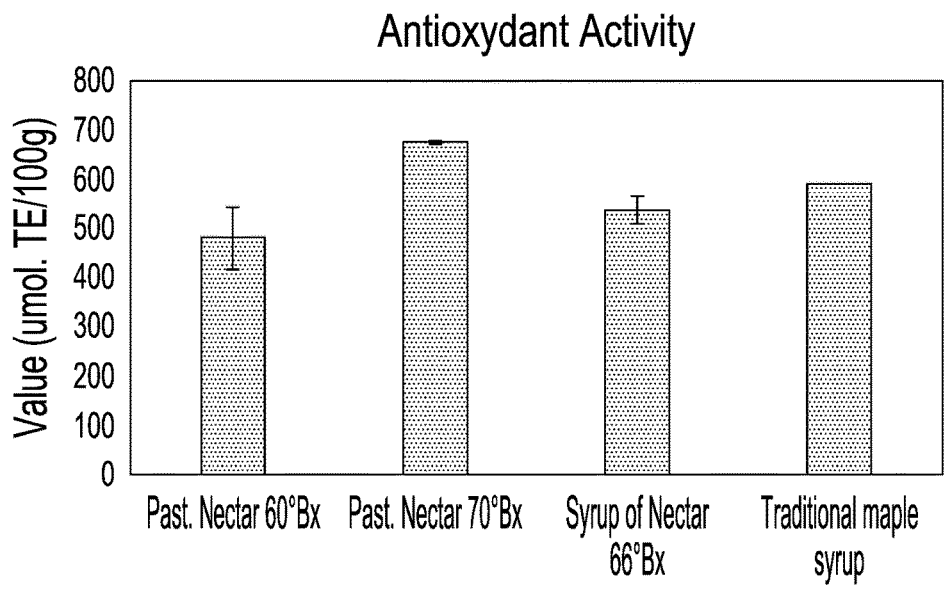
FIG. 12 is a graph showing the Oxygen Radical Absorbance Capacity (ORAC) of the concentrated product according to embodiments of the present invention at various degrees Brix in comparison to conventional maple syrup.
Figure 13:
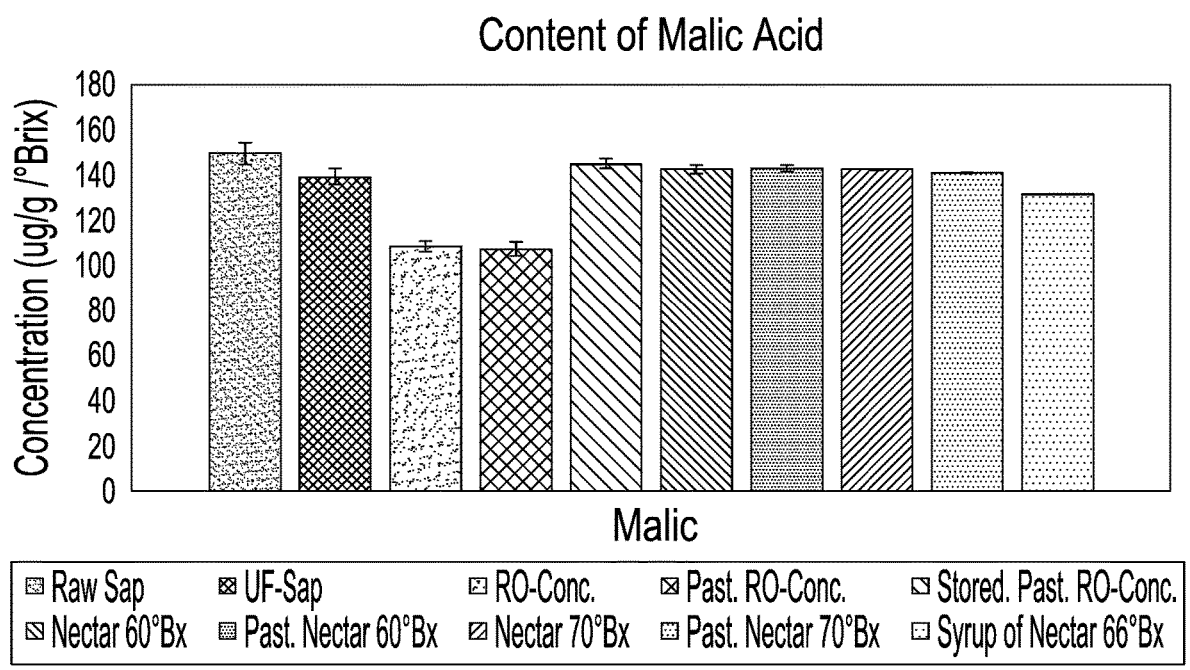
FIG. 13 is a graph showing the concentration of malic acid of various solutions obtained at various stages of the process of the present invention, including the concentrated product according to embodiments of the present invention at various degrees Brix.
Figure 14:
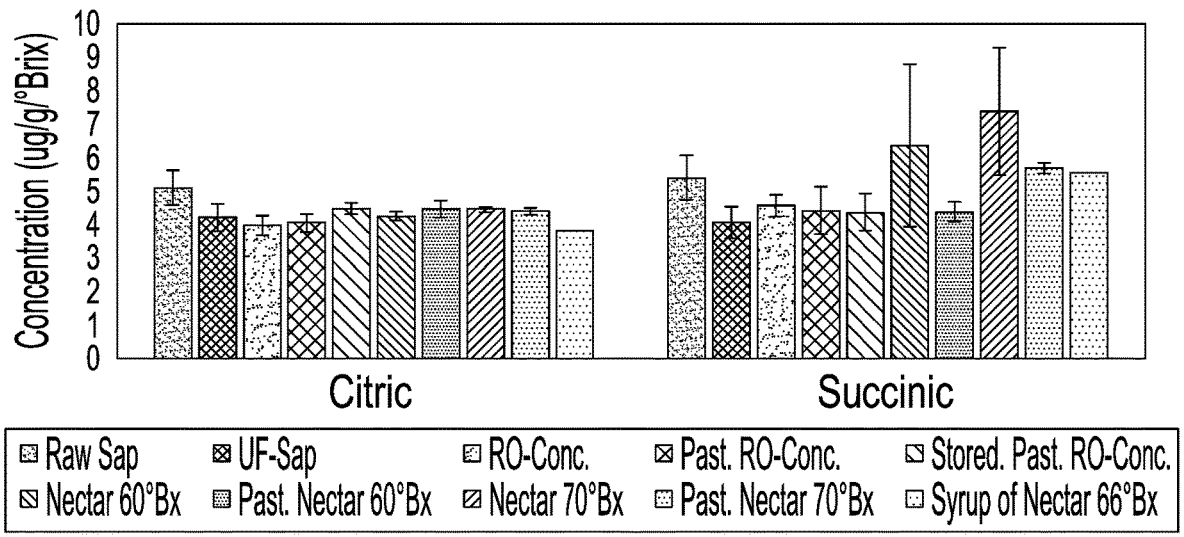
FIG. 14 is a graph showing the concentration of citric acid and succinic acid of various solutions obtained at various stages of the process of the present invention, including the concentrated product according to embodiments of the present invention at various degrees Brix.
Figure 15:
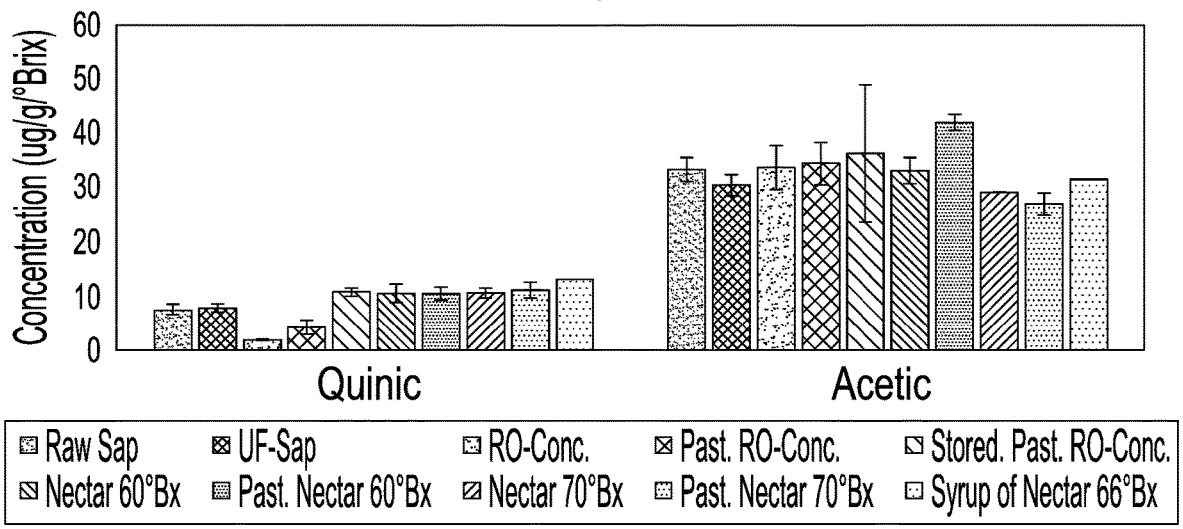
FIG. 15 is a graph showing the concentration of quinic acid and acetic acid of various solutions obtained at various stages of the process of the present invention, including the concentrated product according to embodiments of the present invention at various degrees Brix.
Figure 16:
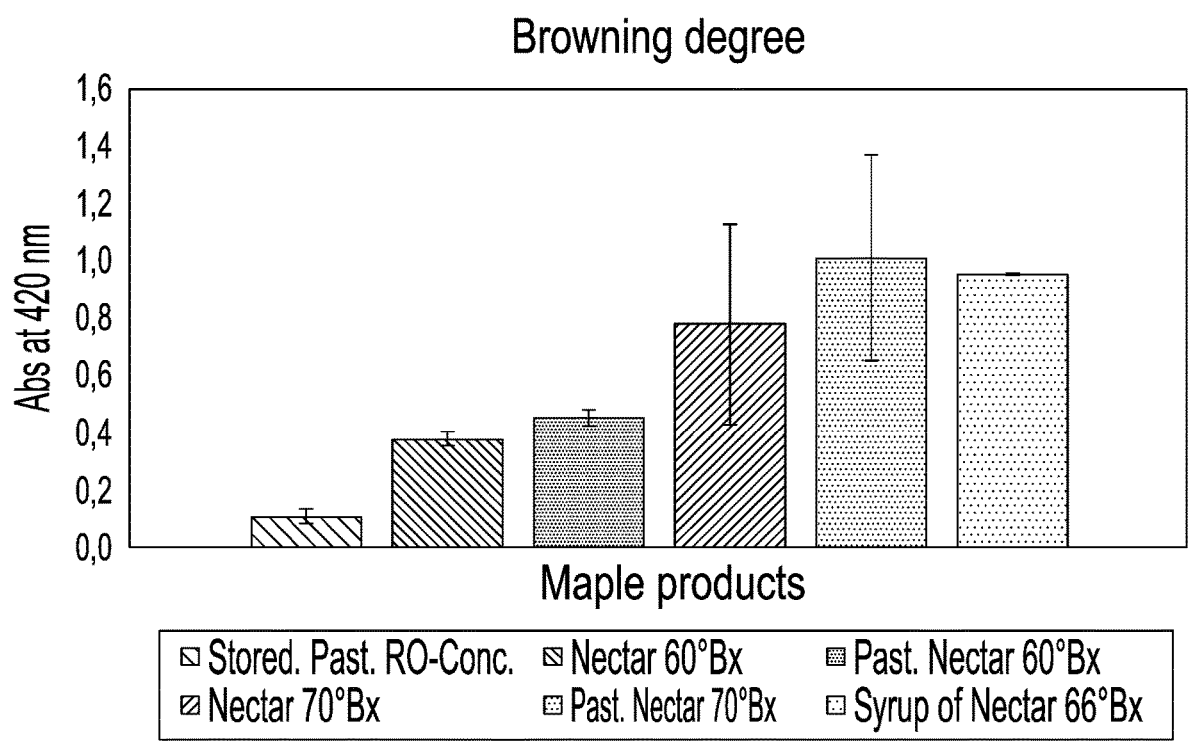
FIG. 16 is a graph showing the browning degree of various solutions obtained at various stages of the process of the present invention, including the concentrated product according to embodiments of the present invention at various degrees Brix.

Referring to FIG. 5, another example of the process according to the present invention is illustrated. First, a supply basin (A) is used to contain the desired volume of sap that is passed into an ultrafiltration unit (B) (which allows for the elimination of microorganisms in the sap) which facilitates migration to a high brix reverse osmosis type concentrator (C), which concentrates the product to up to a 30 brix sugar level (preferably a 40 brix sugar level). Subsequently, the water is transferred to a water bath (1) (or preheater exchanger) to increase its temperature in order to be more efficient in the vacuum evaporation process (D). During a batch transfer (or series) of the volume of water given to the evaporator (D), said evaporator (D) operates over a temperature range from 65 to 80 C to subsequently reach a maximum level of concentration of around 60 to 70 Brix, thus producing Nectar of 60 to 70 Brix before being transferred back to the thermal system (2). The thermal system will condition the sugar water up to a temperature of 85° C., which allows for hot packaging of the concentrated product with high quality nutritional value and maximizing the preservation of the product at room temperature (shelf life).

In the event that concentrated nectar syrup product is desired instead of concentrated Nectar product, the thermal system (2) can be replaced by an evaporator or finisher (E) to allow the concentrate to be transformed into concentrated nectar syrup product by caramelizing it at the same time at a temperature around or above 100 C.

As mentioned, the concentrated product can be a concentrated nectar product or a concentrated nectar syrup product, preferably a concentrated nectar product.

The skilled person would understand that the tank; ultrafiltration unit; reverse osmosis concentrator; water baths; vacuum evaporator; and thermal evaporator can be any tank; ultrafiltration unit; reverse osmosis concentrator; water bath; vacuum evaporator; and thermal evaporator that can be used in the art without adversely affecting the process of the present invention. The skilled person would understand that they can select equipment based on their desired needs (for example, a skilled person would understand that a larger tank can hold more maple sap or sweet vegetal water solution, meaning more of the concentrated product may be produced).

In embodiments, in addition to the advantages previously discussed, the process of the present invention can present one or more of the following advantages:
- The process can allow for concentrating maple sap or sweet vegetal water solutions to between 60 brix and 70 brix without denaturing or altering the nutritional properties of the resulting concentrated product, including for example without the occurrence of Maillard reactions (no cooking of sugars).
- The process can produce a concentrated product with high nutritional value, which can preferably be used as a sweetening agent.
- The process can be a relatively inexpensive concentration process with relatively low energy consumption, thereby making it possible to obtain the most competitive production costs on the market.
- The process can facilitate and improve the preservation of maple sap (or sweetened vegetable water) in the form of the concentrated product.

High Brix Vacuum Evaporation Concentration System

In a second aspect of the present invention, a system for concentrating a maple sap or sweet vegetal water solution into a concentrated product is provided, comprising:
a) a tank (A) for collecting the maple sap or sweet vegetal water solution at temperature T1, wherein T1 is between 4° C. and 10° C.;
b) an optional ultrafiltration unit (B) for filtering the maple sap or sweet vegetal water solution to produce a filtered solution;
c) a reverse osmosis concentrator (C) for concentrating the maple sap or sweet vegetal water solution or the filtered solution to produce a high Brix solution of about 15 to about 40 Brix;
d) a first heating means for heating the high Brix solution of about 15 to about 40 Brix to temperature T2, wherein T2 is between 40° C. and 85° C.;
e) a vacuum evaporator (D) for evaporating the high Brix solution at temperature T3 to produce the concentrated product of about 60 to about 70 Brix, wherein T3 is between 55° C. and 80° C.; and
f) an optional second heating means for heating the concentrated product of about 60 to about 70 Brix to temperature T4, wherein T4 is about 85° C.; or
g) an optional thermal evaporator (E) for heating the concentrated product, if the concentrated product is less than 66 Brix, to temperature T5 until the concentrated product is at least 66 Brix, wherein T5 is between 95° C. and 105° C.

The heating means can be any heating means known in the art. In preferred embodiments, each of the heating means is a water bath or a plate heat exchanger.

In this section, the components of the system (including the tank (A); the ultrafiltration unit (B); the reverse osmosis concentrator (C); the heating means (such as water bath (1) and water bath (2)); the vacuum evaporator (D); and the thermal evaporator (E)) are as described in the previous process section (including the examples provided in FIGS. 1-5). The advantages listed for the process of the present invention are also applicable to the system of the present invention.

The skilled person would understand that the components of the system of the present invention can be organized, structured, or assembled in a variety of manners, so long as the process of the present invention is performed.

Concentrated Product

In another aspect of the present invention, a concentrated product is provided, wherein the concentrated product has a degrees Brix of about 60 to about 70 Brix, and wherein the concentrated product is made from a maple sap or sweet vegetal water solution.

The concentrated product is preferably a concentrated Nectar product.

In preferred embodiments, the concentrated product of the present invention is produced using the process of the present invention as described in the process section above.

In preferred embodiments, the concentrated product of the present invention is produced using the system of the present invention as described in the system section above.

The concentrated product of the present invention has characteristics not present in conventional syrups. To demonstrate this, measurements of various parameters were taken of concentrated products of the present invention. The results of the various tests performed on the concentrated products (and other solutions) are shown in FIGS. 6-16 and Tables 1-9. The tables and figures are discussed in more detail below in the "Experimental Procedures" section.

From the results of tables below, it can be seen that the concentrated product of the present invention (and therefore the process and system used for producing said concentrated product) possesses certain advantages over conventional syrups (discussed in more detail below). Accordingly, in embodiments, the concentrated product of the present invention can present one or more of the following advantages:

Lower levels of bacteria (Aerobic bacteria and/or Anaerobic bacteria) and/or fungi, which can lead to a longer shelf life;

Higher levels of various minerals (such as calcium, potassium, phosphorous, and/or manganese) and/or various organic acids (such as oxalic acid, quinic acid, malic acid, lactic acid, acetic acid, fumaric acid, and/or succinic acid);

Higher Oxygen Radical Absorbance Capacity values;

Fewer or a very low amount of MAILLARD reactions having occurred, meaning the concentrated product is able to not have a characteristic syrup taste (caramelization taste due to cooking)

Many of the above advantages also mean that the concentrated product can be ideal for use as a sweetening agent. In preferred embodiments, the concentrated product (preferably the concentrated nectar product) of the present invention is used as a sweetening agent.

In embodiments, the concentrated product has at least one of the following:

a phosphorus concentration of at least about 15 mg/kg;
a potassium concentration at least about 2500 mg/kg;
a calcium concentration of at least about 1200 mg/kg;
a manganese concentration of at least about 100 mg/kg, preferably at least about 170 mg/kg;
an oxalic acid concentration of at least about 10 mg/kg;
a quinic acid concentration of at least about 100 mg/kg, preferably at least about 500 mg/kg;
a malic acid concentration of at least about 8000 mg/kg;
a lactic acid concentration of at least about 150 mg/kg;
an acetic acid concentration of at least about 700 mg/kg, preferably at least about 1000 mg/kg, more preferably at least about 1500 mg/kg;
a fumaric acid concentration of at least about 130 mg/kg;
a succinic acid concentration of at least about 260 mg/kg;
a total organic acid concentration of at least about 8000 mg/kg, preferably at least about 10000 mg/kg, more preferably at least about 12000 mg/kg;
an ORAC value of at least about 650 µmol TE/100 g;
an aerobic bacteria plate count of at most about 5 UFC/mL, preferably at most about 2 UFC/mL;
an anaerobic bacteria plate count of at most about 5 UFC/mL, preferably at most about 2 UFC/mL; or
a fungi plate count of at most about 5 UFC/mL, preferably at most about 4 UFC/mL, more preferably at most about 2 UFC/mL.

In embodiments, in the concentrated product of the present invention, a concentration of at least one of potassium, calcium, magnesium, manganese, polyphenols, malic acid, citric acid, succinic acid, quinic acid, or acetic acid is at most about 20% lower than, preferably at most about 10% lower than, more preferably at most about 5% lower than, even more preferably at least about the same as, most preferably higher than a concentration of potassium, calcium, magnesium, manganese, polyphenols, malic acid, citric acid, succinic acid, quinic acid, or acetic acid in an initial maple sap or sweet vegetal water solution (when adjusted for degrees Brix).

The scope of the claims should not be limited by the preferred embodiments set forth in the examples, but should be given the broadest interpretation consistent with the description as a whole.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Experimental Procedures

Measurements of various parameters were taken of concentrated products of the present invention and various other solutions. Specifically, many analytical methods were used to measure the properties and to determine the chemical composition of the concentrated products of the present invention and various other solutions, including the following:

Microbial counts: counts were obtained by plating on incorporated agar according to methods (MFHPB-18, MFHPB-22 and ILMA-087)
Brix: digital hand-held refractometer
pH: pH meter
Electrical conductivity: electric conductivity meter
Transmittance: absorbance at 560 nm
Polyphenols content: Folin-Ciocalteu
Carbohydrates content: HPLC-RI
Salts content: ICP/OES
Organic Acids content: HPLC-DAD
Browning degree: spectrophotometer, absorbance measured at 420 nm
Antioxidant activity: ORAC Results and Discussion As previously stated, the results of the various tests performed on the concentrated products are shown in FIGS. 6-16 and Tables 1-9 (see below). As mentioned, FIGS. 6-10 and 13 illustrate the evolution of the presence of various compounds in maple sap solutions as they underwent the process of the present invention (including the concentrated product). It should be noted that for FIGS. 6-11 and 13-16, the legend is presented in the same order (when reading left to right in the first row followed by left to right in the second row, if present) as the bars in the figures. In addition, the legends in FIGS. 6-16 use the following abbreviations:

Raw Sap: Raw Maple Sap
UF-Sap: Ultrafiltred Raw Maple Sap
RO-Conc.: Reverse osmosis Maple Sap Concentrate
Past. RO-Conc.: Pasteurized Reverse Osmosis Maple Sap Concentrate
Stored. Past. RO-Conc.: Stored Pasteurized Reverse Osmosis Maple Sap Concentrate
Nectar 60° Bx: Raw Maple Nectar 60% (concentrated nectar product with Brix of 60)
Past. Nectar 60° Bx: Pasteurized Maple Nectar 60% (pasteurized concentrated nectar product with Brix of 60)
Nectar 70° Bx: Raw Maple Nectar 70% (concentrated nectar product with Brix of 70)
Past. Nectar 70° Bx: Pasteurized Maple Nectar 70% (pasteurized concentrated nectar product with Brix of 70)
Syrup of Nectar 66° Bx: Syrup of Maple Nectar 66° Bx (concentrated nectar syrup product with Brix of 66)

From the results of the tables below, it can be seen that the concentrated product of the present invention possesses certain advantages over conventional syrups. For example, levels of aerobic bacteria and fungi are lower in the concentrated product of the present invention when compared with conventional maple syrup and/or high fructose corn syrup (see Table 1). Similarly, concentrations of various salts (notably calcium, potassium, phosphorous, and manganese) as well as organic acids were significantly higher in the concentrated product of the present invention when compared with those of conventional maple syrup and/or high fructose corn syrup (see Tables 6 and 9). It should be noted that the total concentration of organic acids in the concentrated product of the present invention is over twice as high as that of conventional maple syrup (see Table 9). Furthermore, the concentrated product of the present invention has Oxygen Radical Absorbance Capacity values comparable to or higher than conventional maple syrup (see FIG. 12). These properties of the concentrated product of the present invention have been achieved simply by using the process and system of the present invention, without the use of additives. These results demonstrate that the process of the present invention can produce a concentrated product with high nutritional value, which can be advantageous for use as a sweetening agent.

In addition, looking at FIGS. 6-10 and 13-15, it is shown that the concentration of various minerals and organic acids, such as potassium (see FIG. 6), calcium (see FIG. 6), magnesium (see FIG. 7), manganese (see FIG. 7), polyphenols (see FIG. 10), malic acid (see FIG. 13), citric acid (see FIG. 14), succinic acid (see FIG. 14), quinic acid (see FIG. 15), and acetic acid (see FIG. 15), did not decrease very much, remained the same, or even increased during the process of the present invention, including when comparing the concentrated product with the maple sap solution (when adjusted for degrees Brix). These results demonstrate that the process of the present invention can allow for concentrating maple sap or sweet vegetal water solutions to at least 60 brix or even to 70 Brix without denaturing or altering the nutritional properties of the resulting concentrated product.

TABLE 1

Microbiological quality:

| Product | Plate count (UFC/ml) | | |
|---|---|---|---|
| | Aerobic bacteria | Anaerobic bacteria | Fungi |
| Pasteurized Nectar 60° Bx | <1 | 3 | <1 |
| Pasteurized Nectar 70° Bx | 2 | <2 | <10 |
| Syrup of Nectar 66° Bx | <1 | <1 | 4 |
| Maple syrup 66° Bx [traditional][a] | <150 | not determined | <10 |
| High Fructose Corn Syrup[b] | 20 | not determined | 2 |

[a]Maple syrup of Québec, Industrial data sheet, PPAQ, 2018
[b]INVERTOSE ® High Fructose Corn Syrup 026550, data sheet, Ingredion, May 6, 2020.

TABLE 2

Physicochemical properties:

| Product | Brix (%) | Electrical conductivity (µS/cm) | pH | Transmittance (560 nm) |
|---|---|---|---|---|
| Pasteurized Nectar 60° Bx | [60.5-61.9] | [429-500] | [7.7-8.2] | [82.3-86.2] |
| Pasteurized Nectar 70° Bx | [71.3-72.6] | [92-127] | [6.9-8.5] | [47.3-79.2] |
| Syrup of Nectar 66° Bx | 65.6 | 280 | 8.5 | 62.9 |
| Maple syrup 66° Bx | [66.2-67.3][a] | [96-318][b] | [5.5-8.0][a] | [2.8-87.8][a] |

TABLE 2-continued

Physicochemical properties:

| Product | Brix (%) | Electrical conductivity (μS/cm) | pH | Transmittance (560 nm) |
|---|---|---|---|---|
| (traditional) High Fructose Corn Syrup | 66.6[a] [76.8-77.4] | 185[b] 20[c] | 6.2[b] [3.3-4.5] | 55.5[a] n.d |

[a]Maple syrup of Québec, Industrial data sheet, PPAQ, 2018
[b]van den Berg et al., 2015. Chemical composition of five standard grades of pure maple syrup. Maple Syrup Digest.
[c]for 30% (dry basis) of INVERTOSE ® High Fructose Corn Syrup 026550, data sheet, Ingredion, May 6, 2020.
n.d: not determined.

TABLE 3

Polyphenols content:

Concentration (eq. gallic acid, ppm)

| Product | PastNectar 60° Bx | PastNectar 70° Bx | Nectar syrup 66° Bx | Maple syrup 66° Bx | High Fructose Corn Syrup |
|---|---|---|---|---|---|
| Polyphenols | [202-234] | [285-314] | 385 | 300[a] | not determined[b] |

[a]Liu et al., 2016. Development and UFLC-MS/MS Characterization of a Product Specific Standard for Phenolic Quantification of Maple-Derived Foods
[b]INVERTOSE ® High Fructose Corn Syrup 026550, data sheet, Ingredion, May 6, 2020.

TABLE 4

Carbohydrates content:

Concentration (%_w/w)

| Product | Sucrose | Glucose | Fructose | Fructose + dextrose |
|---|---|---|---|---|
| Pasteurized Nectar 60° Bx | [58.3-58.6] | 0.00 | 0.00 | |
| Pasteurized Nectar 70° Bx | [66.1-70.7] | [0-1.42] | 0.00 | |
| Syrup of Nectar 66° Bx | 60.5 | 1.47 | 0.00 | |
| Maple syrup 66° Bx (traditional) | [60.75-67.67][a] 64.18[a] | [BLQ-0.39][a] 0.11[a] | [BLQ-0.67][a] 0.14[a] | |
| High Fructose Corn Syrup | 0 | not determined | 55[b] | 95[b] |

[a]Maple syrup of Québec, Industrial data sheet, PPAQ, 2018 basis).
[b]INVERTOSE ® High Fructose Corn Syrup 026550, data sheet, Ingredion, May 6, 2020 (dry basis).
BLQ: below level of quantification.

TABLE 5

Salts content:

| Product | Phosphorus | Potassium | Calcium | Magnesium | Manganese |
|---|---|---|---|---|---|
| Pasteurized Nectar 60° Bx | [21.3-25.9] | [2125-2274] | [1336-1347] | [199-207] | [180-183] |
| Pasteurized Nectar 70° Bx | [15.8-21.9] | [2577-2613] | [1429-1622] | [237-243] | [199-208] |
| Syrup of Nectar 66° Bx | 18.9 | 2448 | 1281 | 223 | 185 |
| Maple syrup 66° Bx (traditional) | [0.01-90.7][b] 11.64[b] | [970-3690][a] 2404[a] | [113-1660][a] 785[a] | [10-380][a] 202[a] | [0.3-60][a] 20.5[a] |
| High Fructose Corn Syrup | n.d | BLQ = 200[c] | 40[c] | n.d | n.d |
| LQ (mg/kg) | 0.18 | 0.7 | 2.1 | 0.4 | 0.02 |

Mineral (mg/kg)

| Product | Zinc | Iron | Copper | Total |
|---|---|---|---|---|
| Pasteurized Nectar 60° Bx | [3.6-4.0] | [0.36-0.50] | [0.31-0.57] | 3957 |
| Pasteurized Nectar 70° Bx | [4.0-4.4] | [0.38-0.53] | [0.25-0.26] | 4590 |
| Syrup of Nectar 66° Bx | 3.61 | 0.33 | 0.21 | 4161 |
| Maple syrup 66° Bx (traditional) | [BLQ-12][a] 4.4[a] | [BLQ-21.6][a] 4.4[a] | BLQ-9.9[a] 1.9[a] | 3442[a] |
| High Fructose Corn Syrup | n.d | BLQ = 5[c] | n.d | BLQ = 1000[c] |
| LQ (mg/kg) | 0.08 | 0.03 | 0.14 | |

[a]Maple syrup of Québec, Industrial data sheet, PPAQ, 2018
[b]van den Berg et al., 2015. Chemical composition of five standard grades of pure maple syrup. Maple Syrup Digest.
[c]INVERTOSE ® High Fructose Corn Syrup 026550, data sheet, Ingredion, May 6, 2020 (dry basis).
LQ: Level of quantification of the analytical method used for Nectar products.
BLQ: below level of quantification.
n.d: not determined.

TABLE 6

Ratio of the main minerals to the average value of traditional maple syrup and High Fructose Corn Syrup (HFCS):

| Product comparing to | Salt Maple syrup | Phosphorus Potassium HFCS | Calcium Maple syrup | HFCS | Manganese Maple syrup |
|---|---|---|---|---|---|
| Pasteurized Nectar 60° Bx | 2.0 | 11.0 | 1.7 | 33.5 | 8.8 |
| Pasteurized Nectar 70° Bx | 1.6 | 13.0 | 1.9 | 38.1 | 9.9 |
| Syrup of Nectar 66° Bx | 1.6 | 12.2 | 1.6 | 32.0 | 9.0 |

TABLE 7

Antioxidant activity:

| | ORAC value (µmol TE/100 g) | | | | |
|---|---|---|---|---|---|
| Product | Pasteurized Nectar 60° Bx | Pasteurized Nectar 70° Bx | Syrup of Nectar 66° Bx | Maple syrup 66° Bx (traditional) | HFCS |
| Antioxidant activity | [416-541] | [626-724] | 535 | [312-1566][a] 591[a] | not determined[b] |

TABLE 8

Organic acids content:

| | Organic Acids (mg/kg) | | | | | |
|---|---|---|---|---|---|---|
| Product | Oxalic | Quinic | Pyruvic | Malic | Fumaric | Shikimic |
| Pasteurized Nectar 60° Bx | [16.5-19.3] | [561-696] | [23.8-77.8] | [8421-8732] | [69.3-222] | [8.7-1.,5] |
| Pasteurized Nectar 70° Bx | [12.6-25.4] | [702-896] | [157-208] | [10083-10240] | [64.2-92.5] | [8.7-15.7] |
| Syrup of Nectar 66° Bx | 11.4 | 865 | 23.0 | 8648 | 44.4 | 11.9 |
| Maple syrup 66° Bx (traditional) | [BLQ-27.2][a] 10.7[a] | [BLQ-207][a] 74.6[a] | [BLQ-565][a] 151[a] | [1723-7684][a] 4599[a] | [14-180][a] 60[a] | [BLQ-BLQ][a] BLQ[a] |
| LQ (mg/kg) | 0.37 | 2.00 | 0.15 | 1.85 | 0.05 | 0.11 |

| | Organic Acids (mg/kg) | | | | | |
|---|---|---|---|---|---|---|
| Product | Lactic | Acetic | Citric | Succinic | Tartaric | Total |
| Pasteurized Nectar 60° Bx | [95-114] | [2440-2594] | [254-280] | [243-279] | n.d | 12 579 |
| Pasteurized Nectar 70° Bx | [112-195] | [1773-2200] | [307-328] | [402-417] | n.d | 14 069 |
| Syrup of Nectar 66° Bx | 168 | 2059 | 251 | 363 | n.d | 12 445 |
| Maple syrup 66° Bx (traditional) | [BLQ-254][a] 105[a] | [37-562][a] 254[a] | [116-466][a] 262[a] | [44-394][a] 180[a] | [BLQ-1.6][a] BLQ[a] | 5805[a] |
| LQ (mg/kg) | 1.70 | 5.00 | 5.00 | 5.10 | 0.66 | |

TABLE 9

Ratio of the main organic acids to the average value of traditional maple syrup:

| Product | Oxalic | Quinic | Malic | Lactic | Acetic | Fumaric | Succinic | Total |
|---|---|---|---|---|---|---|---|---|
| Pasteurized Nectar 60° Bx | 1.7 | 8.4 | 1.9 | 1.0 | 9.9 | 2.4 | 1.5 | 2.2 |
| Pasteurized Nectar 70° Bx | 1.8 | 10.7 | 2.2 | 1.5 | 7.6 | 1.3 | 2.3 | 2.4 |
| Syrup of Nectar 66° Bx | 1.1 | 11.6 | 1.9 | 1.6 | 8.1 | 0.7 | 2.0 | 2.1 |

The scope of the claims should not be limited by the preferred embodiments set forth in the examples, but should be given the broadest interpretation consistent with the description as a whole.

The invention claimed is:

1. A process for concentrating a maple sap or sweet vegetal water solution, comprising: a) collecting the maple sap or sweet vegetal water solution in a tank (A) at temperature T1, wherein T1 is between 4° C. and 10° C.; b) optionally filtering the maple sap or sweet vegetal water solution by means of an ultrafiltration unit (B) to produce a filtered solution; c) concentrating the maple sap or sweet vegetal water solution or the filtered solution by means of a reverse osmosis concentrator (C) to produce a high Brix solution of about 15 to about 40 Brix; d) heating the high Brix solution of about 15 to about 40 Brix to temperature T2, wherein T2 is between 40° C. and 85° C.; e) evaporating the high Brix solution by means of a vacuum evaporator (D) at temperature T3 to produce a concentrated nectar product of about 60 to about 70 Brix, wherein T3 is between 55° C. and 80° C., and wherein the concentrated nectar product is essentially free of Maillard reactions or wherein a very low amount of Maillard reactions have occurred; and f) optionally heating the concentrated nectar product of about 60 to about 70 Brix to temperature T4, wherein T4 is about 85° C.

2. The process of claim 1, wherein step f) is performed, such that the concentrated nectar product is a pasteurized concentrated nectar product.

3. The process of claim 1, further comprising a step of hot packaging the concentrated nectar product.

* * * * *